(12) United States Patent
Jobson

(10) Patent No.: US 11,122,010 B2
(45) Date of Patent: Sep. 14, 2021

(54) DATA HUB FOR A CROSS-DOMAIN COMMUNICATION SYSTEM

(71) Applicant: QINETIQ LIMITED, Hampshire (GB)

(72) Inventor: Michael Iain Jobson, Fleet (GB)

(73) Assignee: QINETIQ LIMITED, Hampshire (GB)

( * ) Notice: Subject to any disclaimer, the term of this patent is extended or adjusted under 35 U.S.C. 154(b) by 107 days.

(21) Appl. No.: 15/777,902

(22) PCT Filed: Nov. 10, 2016

(86) PCT No.: PCT/EP2016/077334
§ 371 (c)(1),
(2) Date: May 21, 2018

(87) PCT Pub. No.: WO2017/084966
PCT Pub. Date: May 26, 2017

(65) Prior Publication Data
US 2018/0351914 A1    Dec. 6, 2018

(30) Foreign Application Priority Data
Nov. 19, 2015  (GB) .................................. 1520380

(51) Int. Cl.
*H04L 29/06* (2006.01)
*H04L 12/24* (2006.01)

(52) U.S. Cl.
CPC ...... *H04L 63/0263* (2013.01); *H04L 41/0896* (2013.01); *H04L 41/145* (2013.01);
(Continued)

(58) Field of Classification Search
CPC ............. H04L 63/0263; H04L 63/0227; H04L 41/0896; H04L 41/145; H04L 63/0209;
(Continued)

(56) References Cited

U.S. PATENT DOCUMENTS 5,983,270 A * 11/1999 Abraham ................ H04L 29/06
709/224
7,957,380 B2 * 6/2011 Mirtorabi ................ H04L 45/32
370/221
(Continued)

FOREIGN PATENT DOCUMENTS

EP           2871814 A1    5/2015
WO     WO2004/047402 A1   6/2004
WO    WO-2004047402 A1 *  6/2004  ............. H04L 63/20

OTHER PUBLICATIONS

IP.com Search Query Jun. 12, 2020 (Year: 2020).*
(Continued)

*Primary Examiner* — Samson B Lemma
*Assistant Examiner* — Blake I Narramore
(74) *Attorney, Agent, or Firm* — Kenealy Vaidya LLP

(57) ABSTRACT

Some embodiments are directed to a cross-domain communication system and method. The system includes a data hub connectable to first domain and to a second domain, the first and second domains being isolated from one another. The data hub may be connected independently to the first domain and to the second domain, such that it is able to receive data from the first domain and transmit data to the second domain. The data hub includes a processor, and optionally a data diode, the processor being adapted to inspect packet data received from the first domain, and to run a set of user-defined rules, such that commands are applied to the packet data in accordance with the rules. When a command applied to packet data received from the first domain it creates packet data transmittable to the second domain in real time, such that the first and second domains communicate indirectly via the data hub.

29 Claims, 2 Drawing Sheets

(52) U.S. Cl.
CPC ...... *H04L 63/0209* (2013.01); *H04L 63/0227* (2013.01); *H04L 63/0245* (2013.01); *H04L 63/0428* (2013.01); *H04L 63/105* (2013.01); *H04L 2209/16* (2013.01)

(58) Field of Classification Search
CPC ............. H04L 63/0245; H04L 63/0428; H04L 63/105; H04L 2209/16
See application file for complete search history.

(56) References Cited

U.S. PATENT DOCUMENTS

| | | | | |
|---|---|---|---|---|
| 2002/0024956 | A1* | 2/2002 | Keller-Tuberg | H04L 12/1836 370/395.52 |
| 2002/0073313 | A1* | 6/2002 | Brown | G06F 21/62 713/165 |
| 2006/0095970 | A1* | 5/2006 | Rajagopal | G06F 21/577 726/25 |
| 2007/0081524 | A1* | 4/2007 | Franz | H04L 29/06027 370/356 |
| 2007/0153829 | A1* | 7/2007 | De Juan Huarte | H04W 80/02 370/469 |
| 2007/0204337 | A1* | 8/2007 | Schnackenberg | H04L 63/0227 726/11 |
| 2008/0235731 | A1* | 9/2008 | Bryant | H04N 21/4334 725/44 |
| 2009/0077621 | A1* | 3/2009 | Lang | H04L 63/20 726/1 |
| 2010/0034375 | A1* | 2/2010 | Davis | H04L 9/16 380/42 |
| 2010/0144312 | A1* | 6/2010 | Runstedler | H04M 15/82 455/407 |
| 2012/0092723 | A1* | 4/2012 | Jaudon | G06F 3/1204 358/1.15 |
| 2013/0227615 | A1* | 8/2013 | Bryant | H04N 21/214 725/58 |
| 2015/0030023 | A1* | 1/2015 | Gupta | H04L 45/20 370/390 |
| 2015/0135254 | A1* | 5/2015 | Thilenius | H04L 63/02 726/1 |
| 2015/0324609 | A1* | 11/2015 | Grubel | G06F 21/64 726/26 |
| 2016/0080211 | A1* | 3/2016 | Anand | G06F 16/285 709/224 |
| 2016/0197885 | A1* | 7/2016 | Cismas | H04L 63/04 726/26 |
| 2016/0205071 | A1* | 7/2016 | Cooper | H04L 49/70 726/1 |
| 2016/0334767 | A1* | 11/2016 | Mummigatti | G05B 19/41885 |
| 2017/0098094 | A1* | 4/2017 | Winslow | G06F 21/6218 |
| 2017/0099322 | A1* | 4/2017 | Keini | H04L 63/0263 |
| 2017/0323089 | A1* | 11/2017 | Duggal | G06F 21/126 |

OTHER PUBLICATIONS

International Search Report for PCT Patent App. No. PCT/EP2016/077334 (dated Dec. 15, 2016).
Written Opinion for PCT Patent App. No. PCT/EP2016/077334 (dated Dec. 15, 2016).
Search Report for Great Britain Patent App. No. 1520380.5 (dated Jan. 26, 2016).

* cited by examiner

DATA HUB FOR A CROSS-DOMAIN COMMUNICATION SYSTEM

CROSS REFERENCE TO RELATED APPLICATION(S)

This application is a national phase filing under 35 C.F.R. § 371 of and claims priority to PCT Patent Application No. PCT/EP2016/077334, filed on Nov. 10, 2016, which claims the priority benefit under 35 U.S.C. § 119 of British Patent Application No. 1520380.5, filed on Nov. 19, 2015, the contents of each of which are hereby incorporated in their entireties by reference.

BACKGROUND

Some embodiments relate to the field of cross-domain communication systems and methods, in particular where a first domain has a first security classification, a second domain has a second security classification, and the first security classification is higher than the second security classification.

Simulation of real-life events in order to create accurate training environments has been in use commercially since the mid-1950's, with a number of military and non-military organisations now using simulation widely to train personnel. Early simulations would take place at a single site, or using a single piece of dedicated equipment, such as a flight simulator, to mimic particular physical or environmental situations. Simulations may also be used in management training, for example, where various business or financial scenarios can be produced, again as a training aid. Major uses of simulation technology include military training (such as wargaming), space exploration and medicine, where personnel need to be trained in a wide range of conditions, situations and tactics. Generically, such situations may be termed training simulations, since each relies on a simulated reality to perform some kind of training function.

However, as simulation technology has developed it has become more common to run simulations from multiple sites, since this better represents real-life situations. To do this, communication domains at each site must or should be able to share data with and pass data to one another, in order for the simulation to work in a realistic manner.

Communication between sites may be hampered, however, by their relative security classifications. Taking the simple example of a company having its own intranet, this functions as a single domain with a specified security classification. Only data authorised by the company is transmitted within the domain, for example, between two sites operated by the same company. The internet effectively functions as a second, separate domain, which is unclassified compared with the commercial sensitivity of a company. It may be desirable for the company to publish data on the internet without users of the internet being able to publish data to the company intranet. This may be dealt with using a data diode, or unidirectional gateway, where data can pass between the "high side" (company intranet) and the "low side" (internet) but not between the low side and the high side, thus avoiding any possible data compromise and maintaining security. In other words, data flow is one way to a less secure domain. Data diodes are also very effective where it is desirable to limit data flow one way between a less secure domain and a more secure domain. This situation occurs in government and other secure organisations, where there may be several levels of security classification at many sites. In this situation the data diode is governed by the Bell-LaPadula model, where data can only be created and passed between one level of security classification and levels of classification above. This epitomises the principle of there being no read up or write down: higher security classifications can read the data of lower security classifications but not write data to such classifications, and lower security classifications can write data to higher security classifications but not read data from such classifications.

SUMMARY

Whilst each of these solutions is very successful, the issue of how to deal with a training simulation taking place at different sites, necessitating the transfer of data between different domains, each of which may have a higher or lower security classification than the next, and/or may be linked via an unsecured internet connection. In this situation the only options are to raise/lower the security classification of al domains to be the same, or to restrict data transfer to be between domains with a lower security classification and domains with a higher security classification, but not vice versa. This is clearly an unsatisfactory solution, which may lead to an undue limitation on the transfer of data, leading to compromised or reduced functionality in the training simulation.

As well as applications involving domains of different classifications, it may also be advantageous to connect together domains that may be of the same classification, but where they are owned by different bodies. For example, two companies that generally compete in the same market may be required to work together to provide e.g. a simulation of their respective products working together. Each may not be willing to provide to the other the full specification of their particular products, and so may desire a system that prevents their own proprietary information from passing to the competitor.

Some embodiments address these issues by providing a data hub for providing a connection between at least first and second discrete domains, the domains being used to simulate or model the performance and interaction of a plurality of different entities, the data hub being connected independently to the first domain and to the second domain, such that it is able to receive data from the first domain and transmit data to the second domain; wherein the data hub includes at least a processor adapted to inspect packet data received from the first domain, the packets in general containing information relating to different entities, and to run a set of user-defined rules, at least some of which having conditions associated therewith, that act upon the data packets associated with different entities in different ways, according to one or more conditions associated with each rule to create filtered packet data transmittable to the second domain in real time.

Advantageously, some embodiments may additionally include a data diode, arranged to receive filtered data from the processor and to pass it to the second domain.

The data hub may include additional processors (and, in some embodiments, processor-diode pairs), and so provide a path for the second domain to pass data through (using similar inspection and application of rules to the data) to the first domain. Other processor-diode pairs may be used to communicate with other domains. Each processor may be arranged to have its own set of rules, that are independent from other sets of rules in the hub.

Therefore, in some embodiments the data hub may include a first processor (and, optionally, a data diode) for passing data from the first to the second domain, and a second processor (again, optionally with a data diode) for passing data from the second to the first domain. Each processor acts independently of the other, and has its own set of user-defined rules used to process the incoming data, to create filtered data for passing to the respective domain. The data may relate to entities, that may be simulated or may be real, within the first domain. For example, the data may be derived from a physical object entity, such as an aircraft, a ship, a radar, a sensor etc. or may alternatively be derived from a computer simulation of such an object. An entity may relate to sub-system of a larger object. For example, an entity may include a particular radio system or other component on a larger entity such as an aircraft. The rules will generally have conditions associated therewith, that restrict the application of the rule to a particular entity, or to a particular group or class of such entities.

By connecting the first and second domains to a data hub as described herein the domains are able to communicate indirectly rather than directly, but as the data from the first domain is filtered by the data hub at packet level, it is able to do so in real time. This is especially useful in applications that may require a fast update rate of data between domains, such as in training and/or simulation of systems. It is also advantageous or preferable where the domains have different security classifications, since communication can take place without compromising the security classification or downgrading it prior to sending it from the first domain. This creates a far more efficient process than available previously, regardless of the architecture on which the process is run, whilst maintaining the inherent security of data used within a simulation process.

Accordingly, the first security classification may be higher than the second security classification.

Alternatively or additionally, the second domain is an unsecured connection or domain.

Alternatively, the first and second domains may have equivalent security classifications. The data hub is useful for connecting such domains when at least one of the domains has information that they do not wish to impart to the other.

In some embodiments a rule may be applied to obfuscate data being passed from the first to the second domain. For example, data of a certain precision (e.g. positional or time data) may be amended by the processor to apply a random variation to the data, to make it less sensitive.

In some embodiments a rule may be applied to modify data being passed from the first to the second domain. For example, data may be amended to replace an incoming data field with replacement data, that is less sensitive. Data may also be amended to change the identity of an entity, e.g. to hide its existence, or to make the second domain think another entity is being used.

In some embodiments a rule may be applied to block data being passed from the first to the second domain. For example, data connected with a particular identity may be blocked.

In some embodiments, a rule may be applied to throttle, or limit the rate of data flow to the second domain. For example, a rule may only allow a single data packet to pass to the second domain every n milliseconds, even if the incoming data from the first domain is arriving at a greater rate than this.

These rules are useful inter alia e.g. where a simulation of an object, such as an aircraft, generates information that may give away sensitive information (that may be militarily classified) about the object. Obfuscation of the data using one or more suitable rules may act to suppress the capabilities of the object, and so reduce the classification of the data.

For each rule, there may be (and in general there will be) a condition applied to the rule. The condition may limit the application of the rule to a particular entity. The entity may be identified in each packet, or alternatively, each packet may be identifiable with a particular entity based upon other information within the packet. Each packet is therefore processed as it comes through the hub, and is passed on to the second domain. There is thus no need to wait until a whole file including a plurality of packets has been received at the hub before commencing the processing of the data according to the ruleset. This therefore speeds up data transfer between the first and second domains, to allow real-time operation.

It will be appreciated that, in some embodiments, the rules should be carefully crafted based upon knowledge of the objects or systems being simulated, and upon the degree of censorship to be made to simulation data for transmittal to the second domain.

Advantageously or preferably, each member of the set of rules conforms to a rule type.

The data may be in the form of a protocol data unit (PDU). This is a standard, and well known data format. However, some embodiments are not limited to use with this format, and other formats may be used. A person of ordinary skill will appreciate that the processor can be configured to handle different formats by suitable programming thereof.

In some embodiments the rule type is a Distributed Interactive Simulation (DIS) rule. Advantageously or preferably, conditions and actions are also applied to the data. Conditions may be represented as data operators and actions as data modifiers.

Advantageously, the set of rules may include at least a throttle rule, wherein the throttle rule is arranged to reduce the data rate of data associated with a particular entity flowing from the hub to the second domain, as compared to the data rate of the data flowing from the first domain to the hub. The throttle rule may be arranged to reduce the data rate by only passing through a fraction (i.e. a fraction smaller than 1) of incoming data that is subject to the rule. Alternatively, the throttle rule may be implemented using a timeout value. This value may be assigned to a particular PDU, or PDU and field (e.g. an entity ID). Once a PDU that is subject to a throttle rule has been transmitted to the second domain, a timer is started, and no other such PDU (e.g. from the same entity ID etc.) will be transmitted until a time duration of at least the timeout value is passed. Any incoming matching PDUs that arrive in the meantime are blocked.

In some embodiments the first and second domains are separated by an air gap.

Some other embodiments are directed to a method of cross-domain communication, including: receiving packet data from a first domain having a first sensitivity; inspecting the packet data received from the first domain, the packets in general containing information relating to different entities; running a set of user-defined rules having at least one condition associated therewith to apply commands to the data in accordance with the rules, according to the condition(s) associated with each rule, and according to any entity identification information within the packet; wherein applying a command to data packets received from the first domain creates data packets transmittable to a second domain in real time, the second domain having a second sensitivity, wherein the commands applied to the data act to obfuscate details of systems to which the data relates, and wherein the first and second domains are otherwise isolated from one another.

The domains are able to communicate indirectly via the data hub rather than directly. This is especially useful and advantageous or preferable where the domains have different security classifications, since communication can take place without compromising the security classification or downgrading it, and without swamping data diodes or other unidirectional network devices with unfiltered material.

As the method works at the packet level, rather than at the file level, it is able to operate at a real-time rate, such that any processing delays for such applications as system simulation and training are insignificant as compared with any other delays in the systems.

The method also allows individual entity information, i.e. data relating to individual entities, to be handled differently according to the ID of the particular entity. The rules may thus be set to apply to entities according to the entity ID.

Advantageously or preferably, the steps are carried out at a data hub, and the data hub includes a processor adapted to inspect the data and apply the actions. In this case, advantageously or preferably the data hub is connected independently to the first domain and to the second domain, such that it is able to receive from the first domain and transmit data to the second domain, and wherein the first and second domains communicate indirectly via the data hub.

The data hub may be of the kind described in relation to the first aspect of some embodiments.

The first domain may have a security classification that is higher than that of the second domain. Alternatively or additionally, the second domain is an unsecured connection or domain.

Alternatively, the first and second domains may have equivalent security classifications.

Advantageously or preferably, applying an action to the data obfuscates and filters the data received by the data hub.

Advantageously or preferably, each member of the set of rules conforms to a rule type.

Advantageously or preferably, the data is in the form of a protocol data unit. One data format type is advantageously or preferably a Distributed Interactive Simulation (DIS) rule. Advantageously or preferably, the method further includes applying a set of conditions and actions to the data. The conditions may be represented as data operators and actions as data modifiers.

Advantageously or preferably, the first and second domains are separated by an air gap.

Some other embodiments are directed to a training simulation method including the above method.

BRIEF DESCRIPTION OF THE FIGURES

Some embodiments will now be described by way of example only, and with reference to the accompanying drawings, in which.

DETAILED DESCRIPTION OF EXEMPLARY EMBODIMENTS

Rather than change existing security classifications or employ unidirectional communication that may still not meet requirements, some embodiments take the approach of employing a data hub to filter and obfuscate incoming data from domains having different security classifications, such that although the domains may communicate directly with the data hub, they effectively communicate indirectly with each other, without compromising their security classifications.

Figure 1:
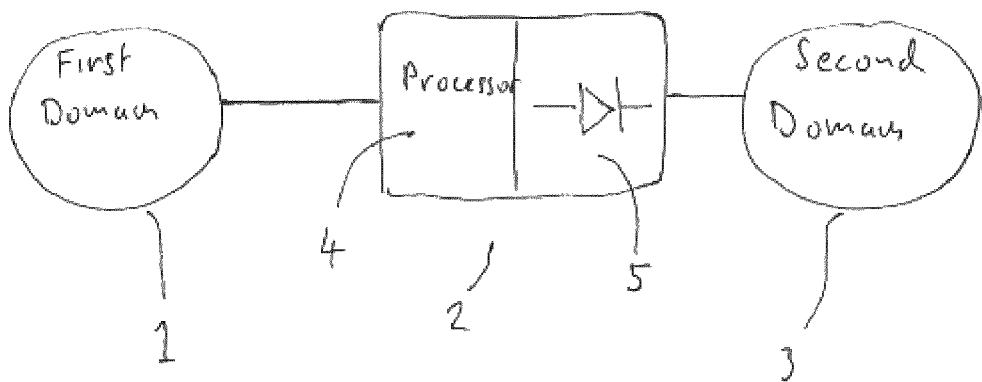
FIG. 1 is a schematic representation of a cross-domain communication system in accordance with some embodiments.

The following embodiment is in the field of wargaming, specifically simulations for military purposes. However, as detailed below, other fields may employ such a data hub, for example, mapping using satellite data with the exclusion of flight information, or other simulations such as major accidents or disease response in the healthcare sector. FIG. 1 is a schematic illustration of a cross-domain communication system in accordance with some embodiments. A first domain 1, having a first security classification, is connected to a data hub 2. A second domain 3, having a second security classification, is also connected to the data hub 2. The first security classification is higher than the second security classification. The data hub 2 is connected independently to the first and second domains 1, 3, such that it is able to receive data from the first domain 1 and able to transmit data to the second domain 3. The first domain 1 and the second domain 3 do not have a direct connection between each other. The data hub 2 includes a computer system and a data diode that is connected in series with the first and second domains. The data hub 2 contains a processor 4 adapted to inspect data received from the first domain 1, and to run a set of user-defined rules, such that commands are applied to the data in accordance with the rules. It further includes data diode 5 connected to the processor 4 and arranged to receive filtered data from the processor and to pass it to second domain 3. This is described in more detail below. The processor may take the form of a general purpose computer, having e.g. a microprocessor, hard drive and internal memory. The processor 4 is arranged to read a configuration file containing the rules that have been generated for a given application.

The rules applied to the data within the processor 4 selectively filter and obfuscate the data, such that when data received from the first domain is passed to the other, they prevent data passing to the second domain that is deemed to be too sensitive to provide to it.

The rules applied conform to a rule type. In the present embodiment, rules based on the following four rule types are used.

BLOCK: When invoked, this rule type prevents the data to which it applies from being passed to the second domain.

SET: When invoked, this rule type applies global overrides to a particular set of data, regardless of the original values from the source data. For example, a constant value will be applied to a data set to mask it's original value.

ALLOW: When invoked, this rule type will allow data to be passed through if particular conditions are met. Optionally, it may also be configured to modify the data, based upon the actual data values. For example, a PDU having a particular content may be modified by this rule type. The modification may be used to downgrade the content of the data to reduce its sensitivity.

THROTTLE: When invoked, this rule type restricts the rate of data throughput, for example, to allow through PDUs at no more than a given number per unit time, or to e.g. allow through every tenth PDU.

IEEE DIS Protocol, IEEE Standard 1278, Version 7 describes a PDU data format used by the current embodiments. However, it will be appreciated that other formats may be used, with suitable setup of the processor.

In the above PDU format, each PDU relates to an object, such as a missile, person, article (e.g. radio), vehicle etc., and further describes parameters associated with the object. For example, it may contain data relating to the position of the object, or its speed, status, model number, or a large variety of other parameters. The PDUs are emitted by simulated objects, so that other objects may be able to interact with them.

A distributed simulation exercise may include, for example, an aircraft simulator operating in a first domain acting in concert with a simulation of a ground environment operating in a second domain. Each of these simulators may be emitting PDUs. The two domains may be owned, for example, by different companies or organisations, and the operator of the first domain may not wish to provide too much detail of the operation of the aircraft to the second operator.

As PDUs come in from the first domain, a set of rules, that have been generated for the particular simulation exercise are applied to each PDU in turn, by the processor.

The rules used by the processor of the present embodiment are made up inter alia of a condition, and an action. The condition determines whether a given PDU is subject to the rule in question, and the action is the processing that takes place on the PDU if the rule in question applies to it.

The rules take the following form:
[RULE TYPE] [PDU_TYPE] [Condition 1] . . . [Condition n]->[Action 1] . . . [Action n]

Here, [RULE_TYPE] is one of the four rule types mentioned above (i.e. BLOCK, SET, ALLOW, THROTTLEX]. In this instance the rule is similar in context to an "if . . . then" statement in common computer language terminology, whereby the Conditions form the "if", the "->" sign can represent the "then" statement, and the (optional) Actions operate as the consequence.

A Condition can be defined as:
[RULE_TYPE] [PDU_FIELD operator VALUE]

Conditions are therefore represented by a variety of operators, such as =, !=, <, >, >=, >=, IN, !IN (the last two being in relation to location fields only).

An Action can be defined as:
[PDU_FIELD modifier VALUE]

Actions are therefore represented by a variety of modifiers such as SET, ADD, SUBTRACT, or VARY.

Table 1 shows, for each of the rule types, whether that rule type accepts conditions, and/or actions. Thus it can be seen that BLOCK accepts conditions that allow it to select which PDUs to process, but that no further action settings can be made—the only action in this case is to discard the PDU. SET, on the other hand is something that applies to all PDUs processed (that aren't first blocked), and so no conditions may be required. Both ALLOW and THROTTLE may require conditions, (thus allowing them to apply just to those PDUs that match the conditions), but Actions (which modify the PDU before allowing it to be sent out) are optional.

TABLE 1

| Rule Type | Conditions | Actions |
|---|---|---|
| BLOCK | Mandatory | N/A |
| SET | N/A | Mandatory |
| ALLOW | Mandatory | Optional |
| THROTTLE | Mandatory | Optional |

A rule is applied to a PDU if all conditions in the rule are satisfied. Should the rule also contain optional Action, the effect of the Action is applied to the PDU before re-transmission to the lower domain.

Examples of these rules are shown below. In the following, an entity is a physical object, such as, for example, an aircraft, a building, a ship, and a force refers to the particular affiliation (i.e. friendly, hostile, or neutral).

The following rule blocks all friendly force PDUs from being passed through from the first to the second domain.
BLOCK: EntityState [FORCE=1]
Note: in the DIS domain a force attribute is an enumerated value whereby: 1 defines a Friendly assets, 2 Opposing, 3 Neutral).

The following rule sets a laser designator PDU with a code value of 1345 regardless of its original value. In this instance the second domain may only process laser codes of a defined range. Alternatively, the rule may be used to mask the capabilities of the platform to the second domain.
SET: Designator [DESIGNATOR.CODE.SET 1345]

The following rule limits the transmission of Entity State PDUs to no more than one every 5 seconds (i.e. 5000 ms), for any entity that has an identification code of 88.18.28. There are various reasons for using such a rule. If the higher domain issues a high frequency of positional updates then, by interpolation of this data, a User within the second domain could infer detailed platform performance. By restricting the frequency of positional updates to the second domain the platform is effectively masking its true performance capability. Alternatively the network infrastructure (or a system on the second domain) may not be able to support high network traffic flows and the throttle ruleset reduces this to a manageable level.
THROTTLE: EntityState 5000 [IS=88.18.28]

The following rule sets various parameters (specifically the Marking, the Force and the Extra field) within the PDU if the entity ID is 88.18.28
ALLOW: EntityState [ID=88.18.28]->[MARKING SET UY31] [FORCE SET 2] [ENUMERATION.EXTRA SET 10]

The following rule examines the Entity ID, and if it matches 88.18.29 then the force and country codes relating to the Entity are randomly varied. The modifier "VARY" randomly generates a new integer between 0 and the value defined in the Action (in this case 3) and then randomly adds or subtracts it from the original value. The objective is add a degree of variability to the original value, and may thus be used to hide the performance of the entity concerned.
ALLOW: EntityState [ID=88.18.29]->[FORCE VARY 3] [ENUMERATION.COUNTRY VARY 10]

The following rule randomly varies the entity location by +/−100 m only if the Entity ID is 88.18.29:
ALLOW: EntityState [ID=88.18.29]->[GEOCENTRIC_LOCATION VARY 100]

The following rule sets the afterburner to ON, for all EntityState PDUs, only if its domain is of type 2 (i.e. an air platform in the DIS domain) and velocity is greater than 200 m/s:
ALLOW: EntityState [GEOCENTRIC_VELOCITY>200] [ENUMERATION.DOMAIN=2]->[APPEARANCE.AIR.AFTERBURNER SET 1]

These are merely examples and many other possibilities may be created from the basic rule types, conditions and actions above.

Figure 2:
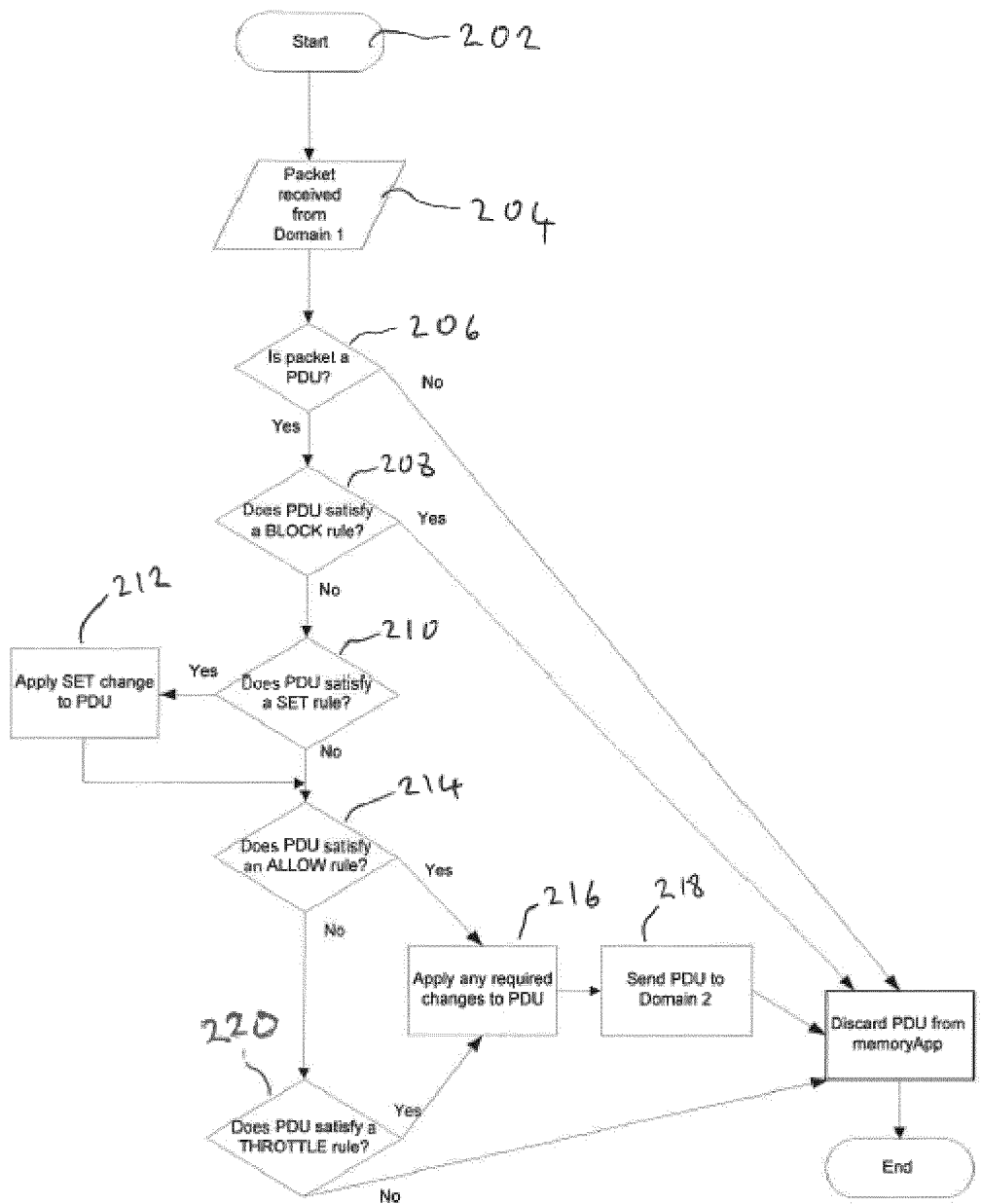
FIG. 2 is a schematic representation of the path of a data unit during use of some embodiments.

FIG. 2 is a schematic representation of the path of a data unit during use of some embodiments. The figure represents the steps taken in the processor when a PDU arrives from the first domain 1. Following the start 202 of the process, a packet is assumed to arrive 204 at the processor, from domain 1. This is then examined 206, to see whether it is a PDU. If not, the data is discarded. If it is a PDU, then it is applied 208 to the BLOCK rule set. Should it match any BLOCK conditions (such as having an entity ID that corresponds to a BLOCK rule), then the PDU is discarded. If the PDU passes this step then the SET ruleset is applied 210. This applies 212 any global changes that need to be made to particular PDUs, according to the SET rules. Next, at step 214, the ALLOW rule set is applied, where the conditions for transmission are applied to the PDU. If the particular PDU is caught by the ALLOW rule condition, then any potentially required actions are performed 216 on the PDU and the PDU is then sent 218 to the second domain (via a data diode, not shown). If an ALLOW rule does not apply to the particular PDU then the PDU is applied 220 to the THROTTLE ruleset. If the PDU is caught by the THROTTLE rule then any optional changes that the rule may require are made, before the PDU is sent 218 to the second domain. Finally, whether or not the PDU has been sent to the second domain, it is deleted from the memory of the processor before the process for this PDU finishes.

Applying a command to data received from the first domain 1 therefore creates data transmittable to the second domain 3. The processor 4 in the data hub 2 carries out all of the processing that may be necessary for this to occur.

Figure 3:
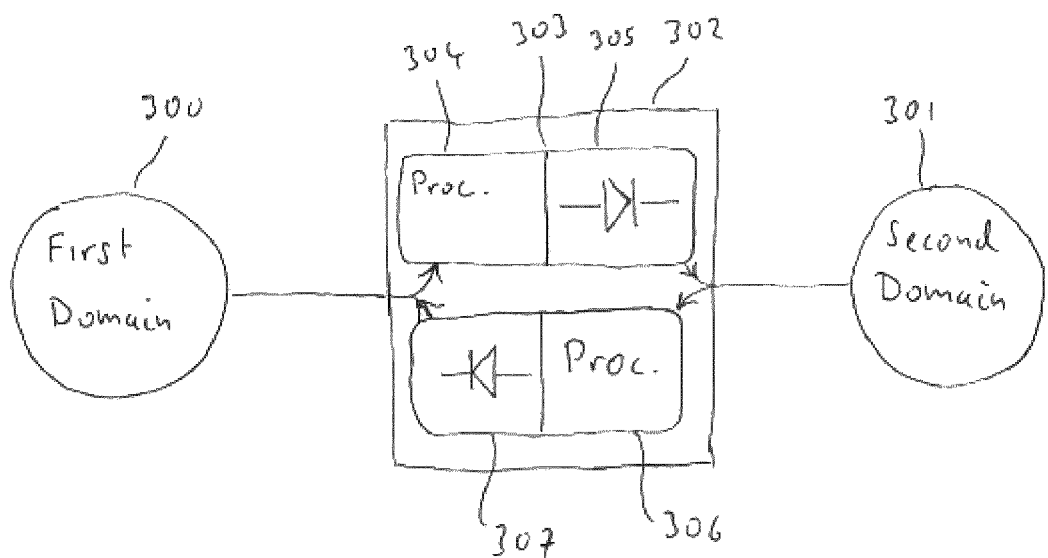
FIG. 3 is a schematic representation of some embodiments, wherein the hub includes two independent processor-diode pairs.

The above process has been described in terms of a PDU flowing from a first domain to a second domain. A similar setup, along with its own set of rules, may be used by a second processor and data diode acting to control flow of data from the second to the first domain. This may be located within a separate physical unit, or may be combined alongside the processor and data diode as described above. FIG. 3 shows such a setup. A first domain 300 connects indirectly to a second domain 301 via hub 302. The hub 302 includes two separate processor-diode pairs. A first processor-diode pair 304, 305 is used to filter network traffic in a similar manner to that described in relation to FIG. 1. The processor 304 receives data from the first domain, and applies rules that have been set up previously, and so filters the data according to the rules. The filtered data is then fed to the data diode 305, from where it is sent to the second domain 301.

The process happens in reverse for data coming from the second domain 301, this time using processor-diode pair 306, 307. Data received by hub 302 is analysed by processor 306 in similar fashion to that as described above. Processor 306 has its own set of rules that are written to provide suitable filtering to prevent data sensitive to the second domain from being passed to the first domain. Processor 306 processes incoming information according to the rules, and passes it to diode 307. Diode 307 then passes the filtered data to the first domain.

Other embodiments may have additional processors, or processor-diode pairs, for linking 3 or more domains together.

A training simulation method may be created based upon the methods described above. This is useful wherever it may be required to simulate real-life events involving several parties. For example, one use of such a system is in the field of healthcare, where training simulations are carried out to prepare for major accidents. Since the domains themselves may be either other simulations or other sites, a number of data hubs 2 may be used to represent and link together hospitals, police, ambulance services, fire services and even individuals. It will be appreciated that, for example, simulation data generated by the police may contain information that they would not like to disclose in its entirety to some other parties that may be taking part in the same simulation, and hence the systems disclosed herein will be beneficial in this regard.

These and other embodiments will be apparent to those of ordinary skill in the art.

Some embodiments may be implemented in any convenient manner. For example, the hub may include a general purpose computer along with appropriate networking hardware, firmware and/or software. The software may be arranged to implement the various processes described herein. The general purpose computer may include a processor, and computer memory or storage for storing a computer program for execution on the processor. Some or all elements of the hub may be arranged to run using dedicated hardware or firmware.

The invention claimed is:

1. A data hub for providing a connection between at least first and second discrete domains, the domains being used to simulate or model the performance and interaction of a plurality of different entities, the data hub being connected independently to the first domain and to the second domain, such that the data hub is able to receive data from the first domain and transmit data to the second domain, the data hub comprising:
   a processor adapted to inspect data packets received from the first domain, each packet containing information relating to only one of the different simulated or modeled entities, and to run a set of user-defined rules, and at least some of the user-defined rules having one or more conditions associated with the at least some of the user-defined rules, and
   at least some of the user-defined rules modify the data packets associated with different simulated or modeled entities in different ways so as to obfuscate details of the simulated or modeled entity to which the packet relates, according to the one or more conditions associated with each rule of the at least some of the user-defined rules, to create filtered packet data transmittable to the second domain in real time; and
   a data diode, arranged to receive filtered data from the processor, and to transmit the filtered data to the second domain; and
   the set of user-defined rules includes at least one rule being of a BLOCK type rule, which prevents data to which such BLOCK type rule applies from being passed to the second domain;
   the set of user-defined rules includes at least one rule being of a SET type rule, which applies global overrides to a particular set of data, regardless of original values from source data;
   the set of user-defined rules includes at least one rule being of an ALLOW type rule, which allows data, which is subject to the ALLOW type rule, to be passed through if particular conditions are met; and
   the set of user-defined rules includes at least one rule being of a THROTTLE type rule, which restricts rate of data throughput.

2. The data hub as claimed in claim 1, wherein security classification of the first domain is higher than security classification of the second domain.

3. The data hub as claimed in claim 1, wherein the security classifications of the first and second domains are equivalent.

4. The data hub as claimed in claim 1, wherein the second domain is an unsecured connection or domain.

5. The data hub as claimed in claim 1, wherein the processor is arranged to apply commands to the data, based upon the rules, to obfuscate the data received by the data hub.

6. The data hub as claimed in claim 1, wherein each member of the set of rules conforms to a rule type.

7. The data hub as claimed in claim 6, wherein the data is in the form of a protocol data unit.

8. The data hub as claimed in claim 7, wherein the processor is arranged to apply conditions and actions to the data, as defined in the set of rules.

9. The data hub as claimed in claim 8, wherein each packet of data is analyzed to ascertain whether such packet of data applies to a particular entity or group of entities, and to process data from these entities according to the conditions contained within the protocol data unit.

10. The data hub as claimed in claim 7, wherein the entity identifier appears within the condition of the protocol data unit.

11. The data hub as claimed in claim 1, wherein the hub has a set of rules that comprises at least a throttle rule, of the THROTTLE type rule, wherein the throttle rule is arranged to not allow data matching some identity criteria to pass through to the second domain at a rate faster than some predetermined rate.

12. The data hub as claimed in claim 1, wherein the hub has a set of rules that includes at least a change rule, that is able to change the identity of an entity.

13. The data hub as claimed in claim 1, wherein conditions are represented as data operators and actions as data modifiers.

14. The data hub as claimed in claim 6, wherein at least one rule type is a Distributed Interactive Simulation (DIS) rule.

15. The data hub as claimed in claim 1, wherein the first and second domains are separated by an air gap.

16. The data hub as claimed in claim 1, wherein the hub further includes a second processor arranged to run a second set of user-defined rules upon data received from the second domain, to obfuscate the data, to create filtered data transmittable to the first domain.

17. A method of cross-domain communication between at least first and second discrete domains, the domains being used to simulate or model the performance and interaction of a plurality of different entities, comprising:
receiving data packets from the first domain;
inspecting the data packets received from the first domain, each packet containing information relating to only one of the different simulated or modeled entities; and
running a set of user-defined rules having at least one condition associated with each rule of the set of user-defined rules, to modify the data packets associated with different simulated or modeled entities in different ways so as to obfuscate details of the simulated or modeled entity to which the packet relates;
and transmitting the modified data packets in real time to the second domain; and
the set of user-defined rules includes at least one rule being of a BLOCK type rule, which prevents data to which such BLOCK type rule applies from being passed to the second domain;
the set of user-defined rules includes at least one rule being of a SET type rule, which applies global overrides to a particular set of data, regardless of original values from source data;
the set of user-defined rules includes at least one rule being of an ALLOW type rule, which allows data, which is subject to the ALLOW type rule, to be passed through if particular conditions are met; and
the set of user-defined rules includes at least one rule being of a THROTTLE type rule, which restricts rate of data throughput.

18. The method as claimed in claim 17, wherein the steps are carried out at a data hub, and the data hub includes a processor adapted to inspect the data and apply the actions.

19. The method as claimed in claim 18, wherein the data hub further includes a data diode arranged to receive data from the processor and to transmit the processed data to the second domain.

20. The method as claimed in claim 18, wherein the data hub is connected independently to the first domain and to the second domain, such that the data hub is able to receive from the first domain and transmit data to the second domain, and wherein the first and second domains communicate indirectly via the data hub.

21. The method as claimed in claim 17, wherein security classification of the first domain is higher than security classification of the second domain.

22. The method as claimed in claim 17, wherein the second domain is an unsecured connection or domain.

23. The method as claimed in claim 17, wherein each member of the set of rules conforms to a rule type.

24. The method as claimed in claim 23, wherein the data is in the form of a protocol data unit.

25. The method as claimed in claim 24, wherein one rule type is a Distributed Interactive Simulation (DIS) rule.

26. The method as claimed in claim 17, further comprising applying conditions and actions to the data.

27. The method as claimed in claim 26, wherein conditions are represented as data operators and actions as data modifiers.

28. The method as claimed in claim 17, wherein the first and second domains are separated by an air gap.

29. The method of claim 17, further comprising performing a training simulation at the first or second domain.

* * * * *